US007582175B2

(12) United States Patent
Trejo-Rincon
(10) Patent No.: US 7,582,175 B2
(45) Date of Patent: Sep. 1, 2009

(54) METHOD OF INLAYING STONE IN WOOD

(76) Inventor: Jorge Trejo-Rincon, 7188 W. Odyssey Way, Tucson, AZ (US) 85743

( * ) Notice: Subject to any disclaimer, the term of this patent is extended or adjusted under 35 U.S.C. 154(b) by 586 days.

(21) Appl. No.: 11/323,840

(22) Filed: Dec. 30, 2005

(65) Prior Publication Data

US 2009/0081403 A1 Mar. 26, 2009

(51) Int. Cl.
*B32B 37/02* (2006.01)
*B32B 38/10* (2006.01)
*B29C 65/54* (2006.01)

(52) U.S. Cl. ......................... 156/71; 156/250; 156/293; 144/351; 144/354

(58) Field of Classification Search ................... 156/71, 156/250, 293; 428/22, 53, 63, 543; 144/351, 144/354
See application file for complete search history.

(56) References Cited

U.S. PATENT DOCUMENTS 1,997,803 A * 4/1935 Miller ......................... 428/50
4,624,815 A * 11/1986 Moufarrege ................ 264/162
5,283,102 A * 2/1994 Sweet et al. ................ 428/167
5,697,413 A * 12/1997 Fuller ......................... 144/356
5,800,752 A * 9/1998 Charlebois ................... 264/71
6,073,408 A 6/2000 Winer et al. .................. 52/385
6,772,748 B2 8/2004 Cleary ........................... 125/5
2004/0023036 A1* 2/2004 Kulcik ........................ 428/413
2005/0006019 A1 1/2005 Ratcliffe ...................... 156/64

FOREIGN PATENT DOCUMENTS

EP 1 398 177 A2 3/2004

* cited by examiner

*Primary Examiner*—Philip C Tucker
*Assistant Examiner*—Sing P Chan
(74) *Attorney, Agent, or Firm*—Hayes Soloway P.C.

(57) ABSTRACT

A method of inlaying stone into a void in a wood surface, comprising the steps of (a) adhesively bonding first stones in said void; (b) sanding tops of said first stones substantially flush with the wood surface; (c) adhesively bonding additional stones in said void; (d) sanding tops of said additional stones substantially flush with said wood surface; and (e) repeating steps (c) and (d) until said void is substantially filled with stones.

13 Claims, 4 Drawing Sheets

METHOD OF INLAYING STONE IN WOOD

TECHNICAL FIELD

The present invention is generally related to woodworking and, more particularly, is related to a method for inlaying stone in wood.

BACKGROUND OF THE INVENTION

Inlays of marble, granite, turquoise, and other stones and vitreous materials have been used in decorative arts for centuries. See, for example, U.S. Pat. No. 6,772,748 and EP 1398177 A2. Typical inlay applications vary widely and encompass many different materials and methods from stone plaques with an embedded metal designs, to table tops constructed with die-cut veneer of differing wood species assembled jig-saw puzzle style and bonded to a substrate.

However, traditional methods of inlaying stone in wood have the disadvantage that the large pieces of stone are separated from the wood by an adhesive. This region separating the wood and stone is aesthetically unappealing and many attempts have been made to minimize the adhesive region.

One method to limit the size of the adhesive region is described in U.S. Patent Application Publication No. 2005/0006019. This application teaches rending a decorative design for the inlaid panel and then transferring the design to a CAD software system. The CAD software is then used to precisely cut, using a laser, the wood inlay and composite panel for a snug fit. While this technique allows precision fitting of man-made voids, it is not economically feasible for inlaying stone in naturally occurring cracks in wood. To fill naturally occurring voids, a three dimensional image of the crack must be created before an inlay may be cut. Imaging the crack and creating a unique precise inlay with this method would be prohibitively expensive.

Furthermore, almost all known inlay methods require sanding or planing after the assembly of the inlay. A significant drawback of the traditional method is that color, which is required to make the inlay stand out, must be impregnated in the material being inlaid. If the color were simply sprayed on to the surface, it would be sanded or planed away. Conventionally, the only way to avoid this problem requires a time-consuming and expensive use of masking tape to isolate each inlay element from its neighboring elements and then subjecting the product to spot finishing. All too often, however, even with such precautions, the colors will often bleed past the boundaries blocked by the masking tape and ruin the effect of the inlay.

Thus, a heretofore unaddressed need exists in the industry to address the aforementioned deficiencies and inadequacies.

SUMMARY OF THE INVENTION

The present invention provides methods for creating an aesthetically appealing wood inlay. More particularly, in accordance with the present invention, stone inlays are provided in voids or cracks in wood by (a) adhesively bonding stones into the void or crack; (b) sanding the tops of the stones substantially flush with the surface of the wood; and repeating steps (a) and (b) with progressively smaller pieces of stone until said void is substantially filled with stones. The void in the wood may be a naturally occurring crack or void or a man-made cut.

Other methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF PREFERRED EMBODIMENTS

Figure 1:
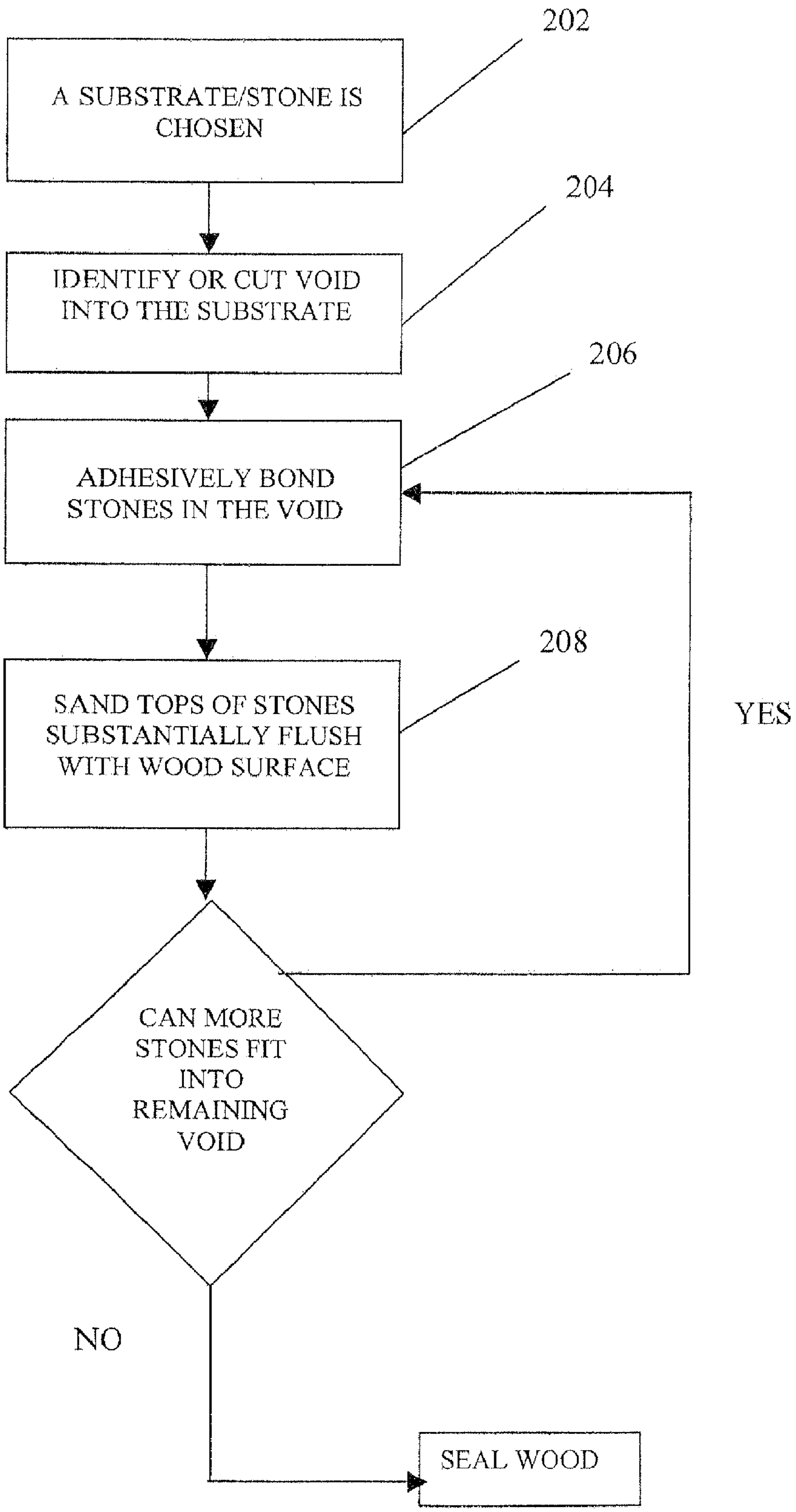
FIG. 1 is a flow chart outlining the steps of the preferred inlaying process of the present invention.

Referring to the drawings, the first step 202 of the process is choosing a substrate and stone. In a preferred embodiment, the substrate is a naturally cracked mesquite wood and the stone is a semi-precious stone such as turquoise.

However, the substrate may be any material including stone. By far the preferred substrate is wood, which can provide a huge variety of graining, color, and texture. The combination of stone and wood is aesthetically pleasing as decoration for various kinds of construction, including flooring, furniture, decorations, and the like.

Among woods, hardwoods are greatly preferred over softwoods because of their rigidity and dimensional stability. Hardwoods are woods that come from deciduous trees and have a closed grain. Types of hardwoods used for furniture construction usually consist of walnut, oak, mahogany, teak, maple, mesquite, and cherry. Typically, most hardwoods are very durable and heavy, and items made from these woods hold up for many years under normal use.

The inlays used in the present invention may be any of a variety of hard, brittle materials, such as concretions of stone such as marble, turquoise or granite, or vitreous materials that are hard and brittle, yet capable of being cut and polished. The stones preferably are semi-precious stones such as turquoise, marble, or coral. Concretions made of Portland or magnesium oxychloride cement or the like also may be employed as the hard materials. Here, the term “stone” shall be used to refer to all such hard, brittle materials, even though vitreous materials are not, strictly speaking, concretions.

In a preferred embodiment of the invention, the wood comprises mesquite (Prosopis glandulosa) which is a hardwood native to the American Southwest and Northern Mexico. Mesquite is quite dense (specific gravity 0.7+) and has very balanced shrinkage on drying which makes it a preferred wood for woodworking. However, mesquite planks often exhibit relatively deep cracks. This latter characteristic provides an opportunity for enhancing the appearance of the mesquite by converting the cracks into inlays in accordance with the present invention. More particularly, decorative stone such as turquoise may be inlaid in the crack in the mesquite. However, if the wood 102 does not contain natural cracks, voids 104 may be cut or routed into the substrate to allow insertion of inlays at step 204. The voids 104 may be of any shape, size, or depth. The voids may be cut manually, using mechanical routers or with a Computer Numerically Controlled (CNC) system.

Figure 2A:
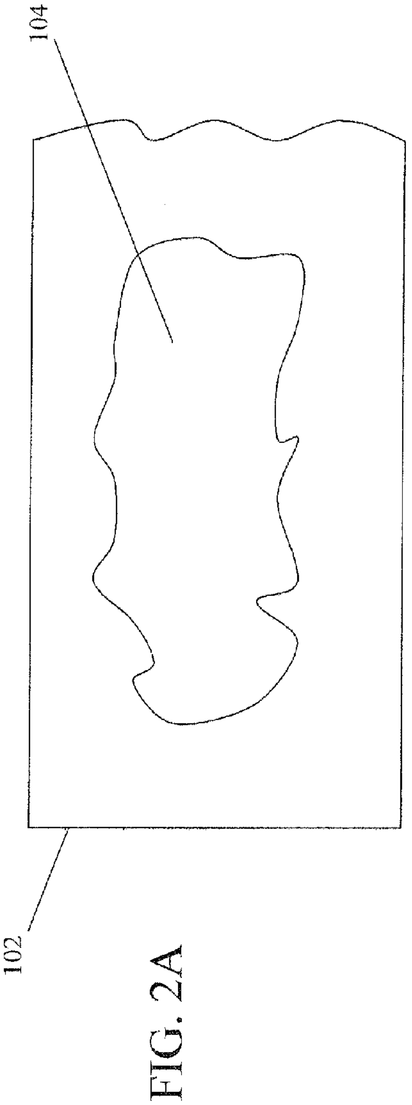
FIGS. 2A-C are exemplary top plan views and FIG. 2D a cross-sectional view.
Figure 2B:
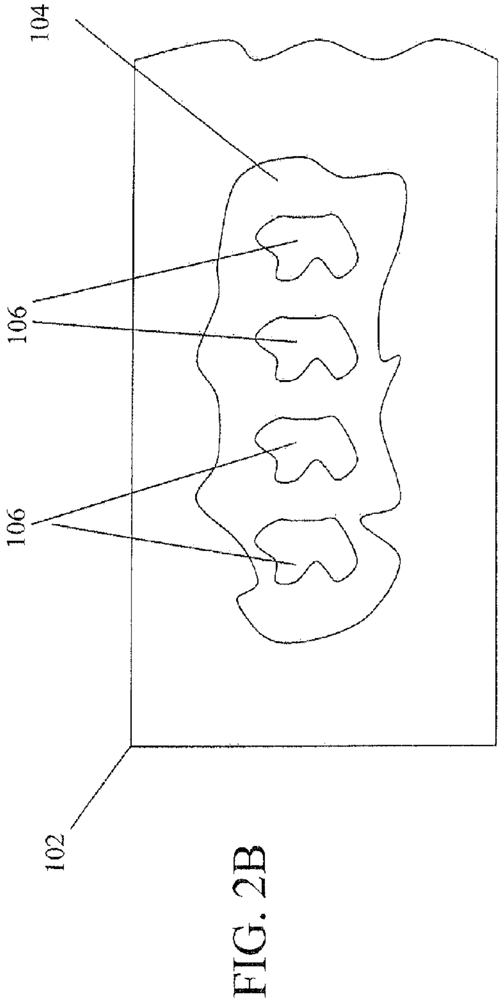
Figure 2C:
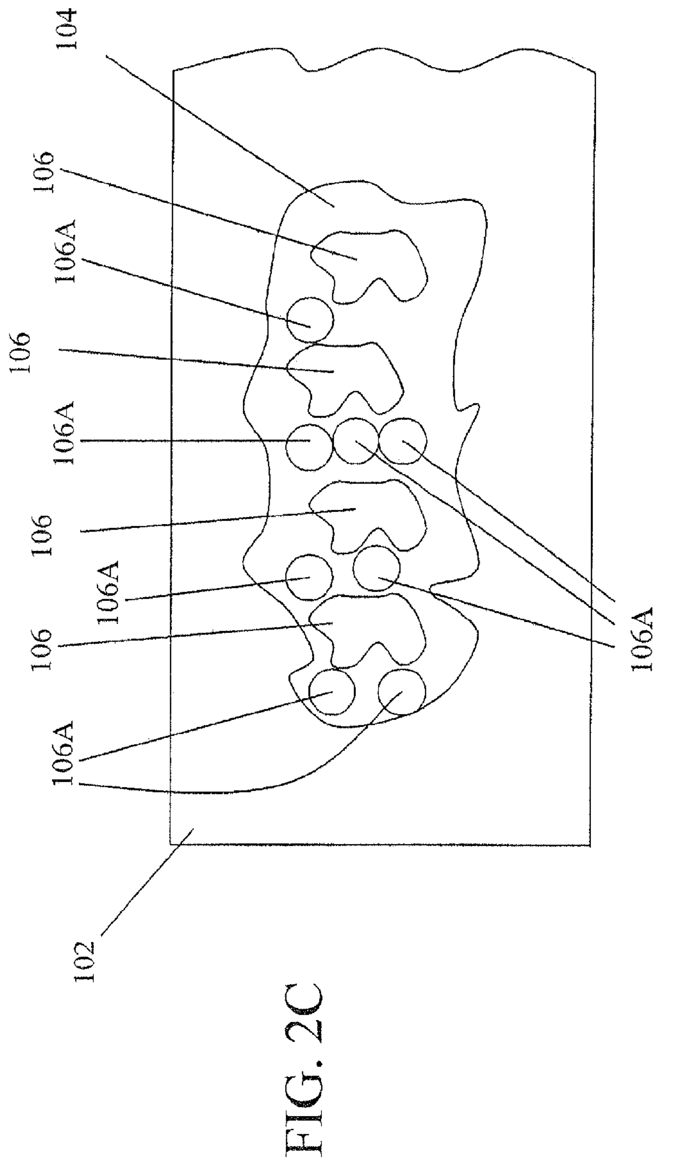
Figure 2D:
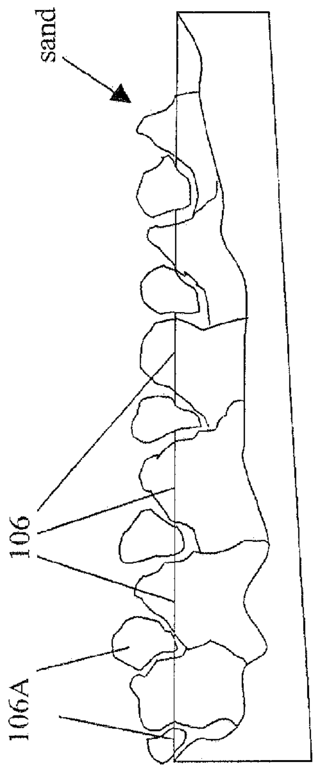
Figures 3A, 3B, 3C:
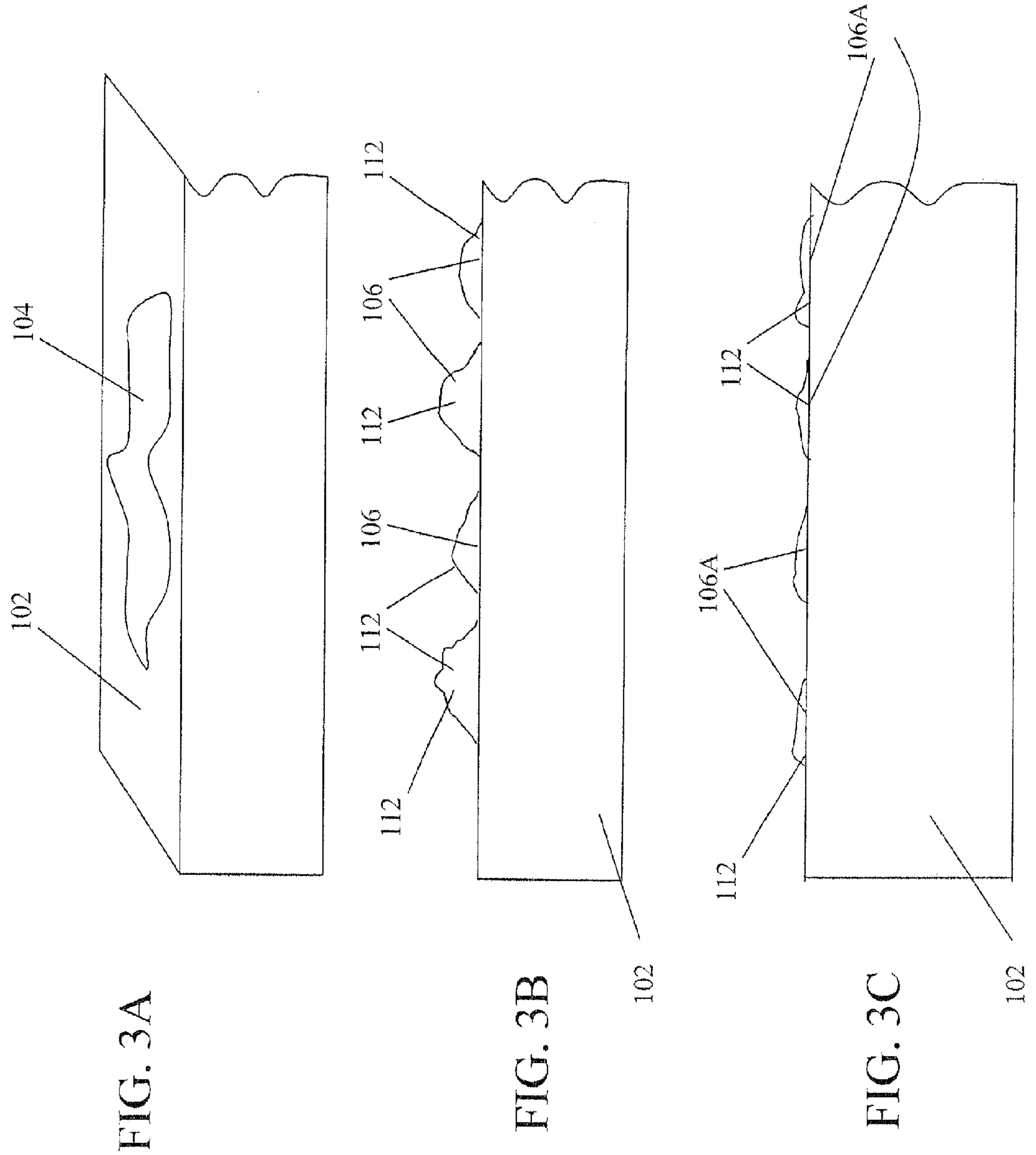
FIG. 3A is a perspective view.
FIGS. 3B-3C are exemplary side elevational views of different stages of the inlaying process of the present invention.

Once the void 104 is cut (or in the case of a natural void or crack, identified), stones 106 are placed within the void as shown in FIG. 2B, and adhesively bonded in place. The stones may be a variety of sizes, but preferably are the largest size stones that can fit into the void. In one embodiment of the invention an adhesive is applied to the stones in step 206. The adhesive may be any suitable carpentry glue, contact cement or fixative, but preferably is an adhesive or a cyanoacrylate adhesive. Cyanoacrylate adhesives are particularly preferred as they are substantially transparent, and provide rapid bonding and exceptional long-term tensile strength. Sufficient adhesive is applied to bond the stones in place. In an alternative embodiment of the invention, adhesive may be applied to the inside and bottom walls of the void, or directly onto the stones before placing the stones in the void. Also, if desired, other substances may be mixed with the adhesive to provide color.

After the adhesive has dried or set, the tops 112 of the stones are then sanded or ground at step 208 substantially flush with the surface 114 of the wood. The sanding dust and fines are dumped or blown from the work piece, and a new "layer" of stones 106A is placed in the void and adhesively bonded in place. The adhesive is allowed to dry or set, and the tops of the stones are then sanded substantially flush with the surface of the wood as before. The sanding fines are again dumped or blown, and the process repeated with progressively smaller stones until the void is essentially filled with stones set in adhesive. If desired, the final fill step may be with a mixture of stone dust and adhesive. Preferably, the inlaid stones are then finally sanded using a multi-step "going through the grits" process, i.e., using progressively finer pieces of sandpaper to get a smooth, highly polished finish. By going through the grits, each progressive piece of sandpaper removes the scratches from the previous piece. Preferably, the worker begins the final sanding with an 80-grade medium coarseness sandpaper and progressive uses 120-220-360- and 420 grades of sandpaper. The process is finished by sanding with a 600-grade super fine sandpaper to create a smooth, highly polished finish on the stone.

The final step 210 in the process involves sealing the wood and the inlay. Sealing the wood protects it from the elements, slows sun and water damage, and keeps the wood from deteriorating. Many different processes for sealing the wood are well known to those skilled in the art.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A method of inlaying stone into a void in a wood surface, comprising the steps of:

(a) adhesively bonding first stones in said void by applying an adhesive to a bottom and/or inside wall(s) of the void, and/or directly to the stones;

(b) sanding tops of said first stones substantially flush with the wood surface;

(c) removing sanding dust from the workpiece resulting from step (b);

(d) adhesively bonding additional stones in said void by applying additional adhesive to a bottom or inside wall(s) of the void, and/or directly to the stones;

(e) sanding tops of said additional stones substantially flush with said wood surface;

(f) removing sanding dust from the workpiece resulting from step (e); and (g) repeating steps (d), (e) and (f) until said void is substantially filled with stones.

2. The method of claim 1, wherein the stones are placed in said void followed by the adhesive.

3. The method of claim 1, wherein the adhesive comprises a cyanoacrylate adhesive.

4. The method of claim 1, wherein said void is a naturally occurring crack in said wood.

5. The method of claim 1, where said void is man-made.

6. The method of claim 1, wherein said stones placed in void in said repeating steps are progressively smaller in size.

7. The method of claim 1, wherein said wood is a hardwood.

8. The method of claim 7, wherein said wood is mesquite.

9. The method of claim 1, wherein said stone comprises a semi-precious stone.

10. The method of claim 9, wherein said semi-precious stone is selected from the group consisting of coral, marble, turquoise, and granite.

11. The method of claim 1, wherein the adhesive is applied to the void before the stones are placed therein.

12. A method of inlaying stone into a void in a wood surface comprising the steps of:

(a) adhesively bonding first stones in said void by applying an adhesive to a bottom and/or inside wall(s) of the void, and/or directly onto the stones;

(b) sanding tops of said first stones substantially flush with said wood surface;

(c) removing sanding dust from the workpiece resulting from step (b);

(d) adhesively bonding additional stones, smaller than the first stones in said void by applying adhesive to a bottom or inside wall(s) of the void, and/or directly to the stones;

(e) sanding tops of said additional stones substantially flush with said wood surface;

(f) removing sanding dust from the workpiece resulting from step (e); and (g) repeating steps (d), (e) and (f) with progressively smaller stones until said wood is substantially filled with stones.

13. The method of claim 12, further comprising the step (h) of sealing said wood.

* * * * *

UNITED STATES PATENT AND TRADEMARK OFFICE

CERTIFICATE OF CORRECTION

PATENT NO. : 7,582,175 B2
APPLICATION NO. : 11/323840
DATED : September 1, 2009
INVENTOR(S) : Jorge Trejo-Rincon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Fourteenth Day of September, 2010

David J. Kappos

David J. Kappos
*Director of the United States Patent and Trademark Office*